United States Patent
Yanev et al.

(10) Patent No.: US 8,905,054 B2
(45) Date of Patent: Dec. 9, 2014

(54) PROTRUSIVE STRUCTURE APPARATUS

(71) Applicants: Kostadin Dimitrov Yanev, Alamo, CA (US); Angel Georgiev Vassilev, Sofia (BG); Ivo Kostadinov Yanev, Sofia (BG); Kamen Radev Dobrev, Varna (BG)

(72) Inventors: Kostadin Dimitrov Yanev, Alamo, CA (US); Angel Georgiev Vassilev, Sofia (BG); Ivo Kostadinov Yanev, Sofia (BG); Kamen Radev Dobrev, Varna (BG)

(73) Assignee: EZ as a Drink Productions, Inc., Venice, CA (US)

( * ) Notice: Subject to any disclaimer, the term of this patent is extended or adjusted under 35 U.S.C. 154(b) by 77 days.

(21) Appl. No.: 13/623,735

(22) Filed: Sep. 20, 2012

(65) Prior Publication Data
US 2014/0076074 A1 Mar. 20, 2014

(51) Int. Cl.
*E04H 15/38* (2006.01)
*E04H 15/44* (2006.01)

(52) U.S. Cl.
USPC ............................ 135/129; 135/132; 135/133

(58) Field of Classification Search
USPC ......... 135/129, 132, 133, 137, 148, 152, 153, 135/154, 906, 908; 248/165, 150, 346.3, 248/346.06, 694; 108/138, 139, 141; 52/641, 646, 65, 80.1
See application file for complete search history.

(56) References Cited

U.S. PATENT DOCUMENTS

| | | | | | |
|---|---|---|---|---|---|
| 2,582,791 | A | * | 1/1952 | Page ............................. | 108/138 |
| 2,673,773 | A | * | 3/1954 | Dusenbury ................... | 108/138 |
| 2,724,430 | A | * | 11/1955 | Garner ......................... | 248/439 |
| 3,261,308 | A | * | 7/1966 | Szymber ....................... | 108/145 |
| 3,949,962 | A | | 4/1976 | Wilson .......................... | 249/18 |
| 4,021,974 | A | | 5/1977 | Edwards ........................ | 52/63 |
| 4,441,432 | A | * | 4/1984 | Carlton ......................... | 108/5 |
| 4,566,475 | A | | 1/1986 | Wund ............................ | 135/99 |
| 4,637,941 | A | | 1/1987 | Rochte .......................... | 428/8 |
| 4,746,022 | A | | 5/1988 | Benham ........................ | 211/195 |
| 4,918,884 | A | * | 4/1990 | Okazaki et al. ............... | 52/108 |
| 5,003,736 | A | * | 4/1991 | Okazaki et al. ............... | 52/108 |
| 5,163,262 | A | * | 11/1992 | Adams .......................... | 52/646 |
| 5,203,125 | A | | 4/1993 | Sugizaki ........................ | 52/66 |
| 5,351,449 | A | | 10/1994 | Allen et al. .................... | 52/6 |
| 5,842,495 | A | | 12/1998 | Egnew et al. ................. | 135/133 |
| 5,941,400 | A | * | 8/1999 | Lemaire ........................ | 211/201 |
| 6,457,423 | B1 | * | 10/2002 | Gordon ......................... | 108/90 |
| 7,137,399 | B1 | | 11/2006 | Ransom et al. ............... | 135/128 |

FOREIGN PATENT DOCUMENTS

WO WO 2014/047414 3/2014

* cited by examiner

*Primary Examiner* — Noah Chandler Hawk
(74) *Attorney, Agent, or Firm* — Pillsbury Winthrop Shaw Pittman LLP (57) ABSTRACT

This disclosure relates to an apparatus configured to transform from a retracted configuration to a protruded configuration, and vice versa, by rotating via one or more guides disposed on a base. The apparatus may be formed in different sizes, from various materials depending on the intended use of the apparatus. In some implementations, the apparatus may include one or more of guides, a base, one or more members, a coupler, and/or other components.

22 Claims, 8 Drawing Sheets

PROTRUSIVE STRUCTURE APPARATUS

FIELD OF THE DISCLOSURE

This disclosure relates to an apparatus configured to transform from a retracted configuration to a protruded configuration, and visa versa, by rotating via one or more guides disposed on a base.

BACKGROUND

Various collapsible structures exist. Examples of existing collapsible structures include a construction form configured to collapse against a linear central beam (similar to an umbrella design), a single spiral element configured to collapse from a conical shape to a flattened shape based on the geometric spiral form, a portable shelter with folding support members so the shelter may be folded to a smaller size, and a portable shelter with flexible support members wherein the flexible support members bend to a smaller size.

SUMMARY

One aspect of the disclosure relates to an apparatus configured to transform between a retracted configuration and a protruded configuration by rotating via one or more guides disposed on a base. The apparatus may be configured for use with an exercise system. The principles and apparatus described herein may be applied to other fields for other uses. The apparatus may be formed in different sizes, from various materials depending on the intended use of the apparatus. In some implementations, the apparatus may comprise one or more of guides, a base, one or more members, a coupler, a superstructure, and/or other components.

The base may be configured to support the apparatus such that the apparatus maintains its orientation and/or position. In some implementations, the base may be placed on a surface, a user may hold the apparatus, the apparatus may be suspended between surfaces, and/or the apparatus may be positioned in another way. The base may be configured to support the weight of the components of the apparatus and/or maintain an orientation of the components of the apparatus relative to each other. The base may comprise a first surface toward a first side of the base and a second surface toward a second side of the base.

One or more guides may be disposed on the first surface of the base. In some implementations, the guides and the base may be integrated as a singular component. The guides may be radially spaced about an axis of rotation. The axis of rotation may be substantially perpendicular to the first surface. Inner ends of the guides may be positioned at a radius closer to the axis of rotation relative to outer ends of the guides at a second radius. In some implementations, individual ones of the one or more guides may have an arcuate shape, a straight shape, and/or other shapes.

The members may be configured to translate via the guides. Individual ones of the members may correspond to individual ones of the guides. The members may be configured to extend from an inward end of the member positioned proximate to the axis of rotation toward an outward end of the member. In some implementations, the members within the same apparatus may have a variable length and/or curvature such that diverse dome shapes may be achieved when the apparatus is in the protruded configuration. The outward ends of the members may be configured to translate via the guides from the outward ends of the guides toward the inward ends of the guides and/or from the inward ends of the guides toward the outward ends of the guides. The inward ends of the members may be configured to couple with each other proximate to the axis of rotation. An inward end of a first member may be fixed to the inward end of a second member such that the first member and the second member form a singular component. In some implementations, a single member may be used instead of and/or in addition to the two members configured to join to form a singular component. The single member may be configured such that opposite ends of the member may be positioned in guides on substantially opposite sides of the base. For example, the member may span a diameter of the apparatus. Such a member's material elasticity may cause the protrusion of the member when the opposite ends of the member are rotated to the inner ends of the guides. The member's elasticity may control the stiffness of the protruded apparatus.

The coupler may be configured to couple the inward ends of the members. The coupler may comprise a coupling device positioned proximate to the axis of rotation. The inward ends of the members may be coupled by the coupler such that the members extend outwardly from the coupler toward the guides.

The retracted configuration may be formed when the outward ends of the members are positioned at and/or near the outward ends of the guides. The outward ends of the members may be configured to translate via the guides from the inward ends toward the outward ends of the guides, causing the apparatus to collapse to a retracted configuration. The protruded configuration may be effectuated from the retracted configuration by translating the outward ends of the members from the outward ends of the guides to the inward ends of the guides.

A post may be configured to control the member curvature, a maximum protrusion distance, and/or other aspects of the apparatus. The post may be disposed proximate to the axis of rotation. The post may be configured such that the coupler may translate along the post responsive to the apparatus changing between the retracted configuration and the protruded configuration.

A super-structure may be coupled to the apparatus. The super-structure may comprise a material coupled to the members. The material may be configured to form a substantially domed shaped super-structure over the apparatus responsive to the apparatus occupying the protruded configuration.

A locking mechanism may be configured to releasably lock the apparatus in the retracted configuration and/or in the protruded configuration. The locking mechanism may comprise a retracted-configuration locking mechanism and a protruded-configuration locking mechanism.

In some implementations, the guides may form one or more continuous guides. One or more inner portions of the continuous guides may be positioned closer to the axis of rotation relative to one or more outer portions of the continuous guides. The protruded configuration may be effectuated from the retracted configuration by translating the outward ends of the members from the outer portions to the inner portions of the continuous guides, causing the apparatus to protrude from the retracted configuration to the protruded configuration. In some implementations, the continuous guides may comprise a single continuous guide wherein an outward end of the first member and outward end of the second member engage substantially opposite sides of the continuous guide.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
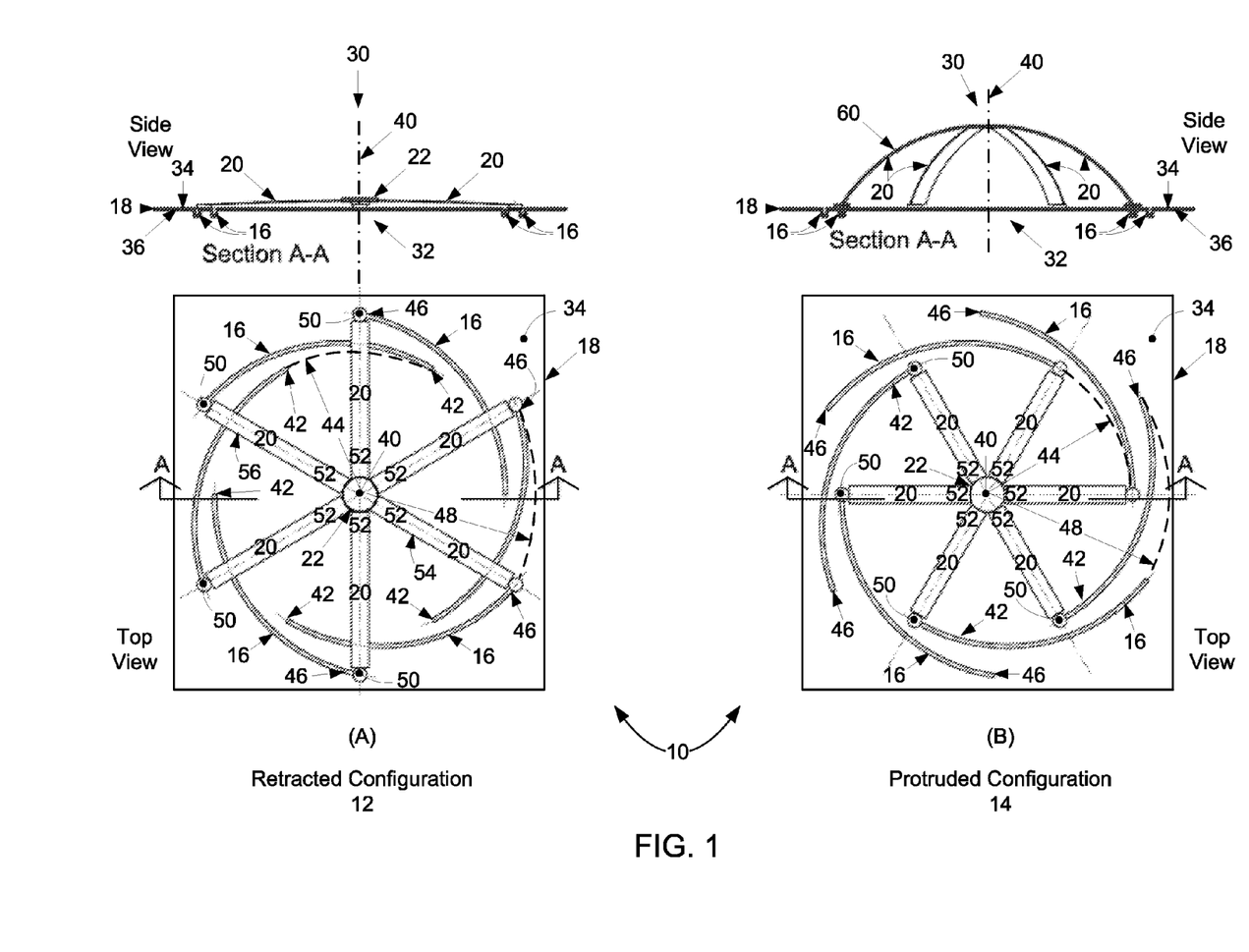
FIG. 1 illustrates an apparatus configured to transform between a retracted configuration and a protruded configuration by rotating via one or more guides disposed on a base, in accordance with one or more implementations.

FIG. 1 illustrates an apparatus 10 configured to transform between a retracted configuration 12 (FIG. 1A) and a protruded configuration 14 (FIG. 1B) by rotating via one or more guides 16 disposed on a base 18, in accordance with one or more implementations. Apparatus 10 may be configured for use with an exercise system such as, for example, those described in patent application Ser. No. 13/527,465 filed Jun. 19, 2012, entitled "Personal Wellness Device", patent application Ser. No. 13/403,803 filed Feb. 23, 2012, entitled "Personal Exercise Device", and/or patent application Ser. No. 12/818,977 filed Jun. 18, 2010, entitled "Modular Exercise System", all of which are incorporated herein by reference. The description herein of the use of apparatus 10 in conjunction with an exercise system is not intended to limit the scope of the disclosure. Rather, it will be appreciated that the principles and apparatus described herein may be applied to other fields for other uses. Such uses may include roofing, concrete forms, shattering, scaffolding, shelters, artwork, toys, sports equipment, packaging, mining support structures, military camouflage, warehousing, transportation, a lifting mechanism (e.g., a jack), means of winding a spring (e.g., in weapons and/or mechanical tools), and/or other uses for a retractable structure on the ground, underwater, and/or in space. For example, apparatus 10 may be configured to be used as a retractable landing damper for a helicopter. When the helicopter is airborne, the damper may be retracted so as not to obstruct the aerodynamics of the helicopter. When landing, the damper may be protruded such that the elasticity of apparatus 10 may soften the landing of the helicopter. While landed, variable protrusion heights on multiple apparatus located at various locations on the helicopter may be used to level the helicopter on an uneven surface. Apparatus 10 may be formed in different sizes, from various materials depending on the intended use of apparatus 10. For example, used as a concrete form, apparatus 10 may be made from metal components and have a diameter of several feet or more. Used in a toy, apparatus 10 may be made from plastic components and have a diameter of an inch or less. In some implementations, apparatus 10 may comprise one or more of guides 16, base 18, one or more members 20, a coupler 22, and/or other components.

Base 18 may be configured to support apparatus 10 such that apparatus 10 maintains its orientation and/or position. In some implementations, base 18 may be placed on a surface, a user may hold apparatus 10, apparatus 10 may be suspended between surfaces, and/or apparatus 10 may be positioned in another way. Base 18 may be configured to support the weight of the components of apparatus 10 and/or maintain an orientation of the components of apparatus 10 relative to each other. Base 18 may comprise a first surface 34 toward a first side 30 of base 18 and a second surface 36 toward a second side 32 of base 18. Base 18 may have a circular, rectangular, triangular, square, and/or other form factor. Base 18 may be planar, a three dimensional structure, a curved structure, and/or may be another shape. The form factor of base 18 shown in FIG. 1 is not intended to be limiting. Base 18 may be formed from one or more materials including rock, soil, stone, rubble, sand, concrete, metal, plastic, wood, and/or other materials, for example. Base 18 may have any form factor and/or be formed from any material that allows it to function as described in the present disclosure.

One or more guides 16 may be disposed on first surface 34 of base 18. In some implementations, guides 16 and base 18 may be integrated as a singular component. Guides 16 may be radially spaced about an axis of rotation 40. Axis of rotation 40 may be substantially perpendicular to first surface 34. In FIG. 1, six guides are shown. The six guides shown in FIG. 1 may be equally spaced around axis of rotation 40. Inner ends 42 of guides 16 may be positioned at a radius 44 closer to axis of rotation 40 relative to outer ends 46 of guides 16 at a radius 48. In some implementations, individual ones of the one or more guides may have an arcuate shape, a straight shape, and/or other shapes. In some implementations, guides 16 disposed on first surface 34 of base 18 may have a depth that extends into and/or through base 18. In some implementations, guides 16 may protrude from second surface 36 of second side 32 of base 18. The number, spacing, and/or shape of guides 16 shown in FIG. 1 is not intended to be limiting. The number and/or spacing of guides 16 in apparatus 10 may vary from what is described by FIG. 1, provided apparatus 10 functions as described herein. Guides 16 may include one or more of a track, a channel, a slot, a groove, a rail, and/or other guides that allow translation of members 20.

Members 20 may be configured to translate via guides 16. Individual ones of members 20 may correspond to individual ones of guides 16. As shown in FIG. 1, members 20 may be radially spaced at even 60 degree intervals. Members 20 may be configured to extend from an inward end 52 positioned proximate to axis of rotation 40 toward an outward end 50. Outward ends 50 of members 20 may be configured to translate via guides 16 from outward ends 46 of guides 16 toward inward ends 42 of guides 16 and/or from inward ends 42 of guides 16 toward outward ends 46 of guides 16. Inward ends 52 of members 20 may be configured to couple with each other proximate to axis of rotation 40.

In some implementations, individual ones of members 20 may have a rectangular form factor. In some implementations, individual ones of members 20 may have a rectangular cross-sectional shape. In some implementations, members 20 may have a form factor and/or a cross-sectional shape other than rectangular. Members 20 may be configured to be flexible and/or rigid. Members 20 may be formed from one or more resilient flexible materials, and/or one or more rigid materials. The materials may include metal; non-armed, reinforced, and/or pre-stressed concrete; plastic; wood; and/or other materials. In some implementations, members 20 may be configured with a specific material elasticity. The material that forms members 20 may be configured to resist deformation such that members 20 protrude when apparatus 10 is changed from retracted configuration 12 to protruded configuration 14. The material elasticity of members 20 may control the stiffness of apparatus 10 in protruded configuration 14. In some implementations, apparatus 10 may be used for damping. Damping may be adjusted manually and/or automatically. The number, spacing, and/or shape of members 20 shown in FIG. 1 is not intended to be limiting. For example, the number and/or spacing of members 20 in apparatus 10 may vary from what is described by FIG. 1. As another example, an inward end 52 of a first member 54 may be fixed to the inward end 52 of a second member 56 such that first member 54 and second member 56 form a singular component. In some implementations, a single member may be used instead of and/or in addition to the two members 54, 56, configured to join to form a singular component. The single member may be configured such that opposite ends of the member may be positioned in guides 16 on substantially opposite sides of base 18. For example, the member may span a diameter of apparatus 10. Such a member's material elasticity may cause the protrusion of the member when the opposite ends of the member are rotated to the inner ends 42 of guides 16. The member's elasticity may control the stiffness of the protruded apparatus.

Figure 2:
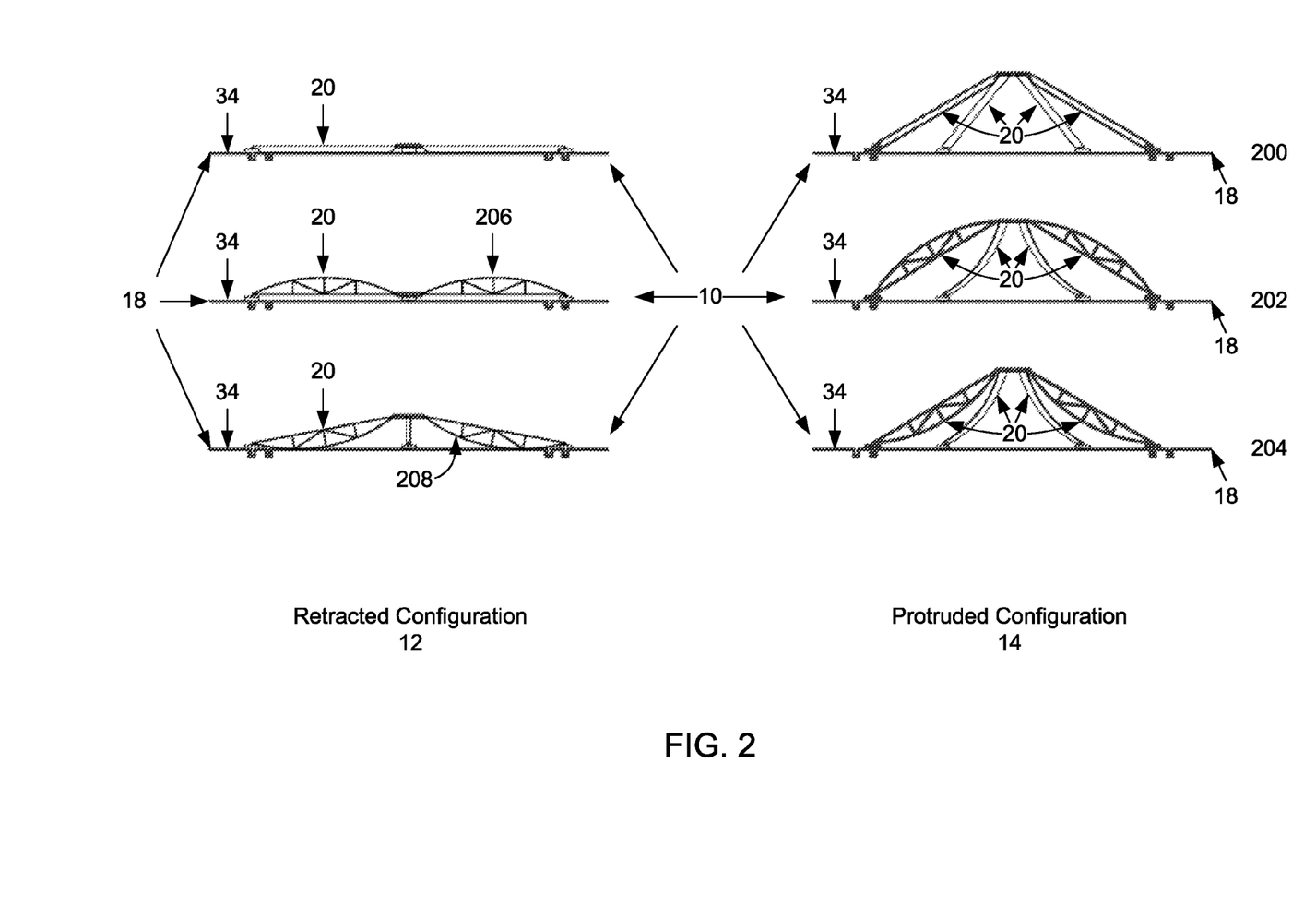
FIG. 2 illustrates three types of members, in accordance with one or more implementations.

FIG. 2 illustrates three member types 200, 202, 204 for members 20, in accordance with one or more implementations. Individual ones of members 20 may comprise one or more of straight beams, curved beams, trusses, and/or other members. In FIG. 2, apparatus 10 is shown in retracted configuration 12, and protruded configuration 14 for each member type. FIG. 2 illustrates straight beam 200, first bowstring truss 202, and second bowstring truss 204. Straight beam 200 may be flexible. First bowstring truss 202 and second bowstring truss 204 may be rigid. First bowstring truss 202 may be oriented such that a first side 206 of bowstring truss 202 is positioned away from surface 34 of base 18. Second bowstring truss 204 may be oriented such that a first side 208 of bowstring truss 204 is positioned toward surface 34 of base 18.

Returning to FIG. 1, coupler 22 may be configured to couple inward ends 52 of members 20. Coupler 22 may comprise a coupling device positioned proximate to axis of rotation 40. Inward ends 52 of members 20 may be coupled by the coupler such that members 20 extend outwardly from coupler 22 toward guides 16. In some embodiments, members 20 may be fixedly coupled to coupler 22. In some embodiments, members 20 may be removably coupled to coupler 22. Coupler 22 may include one or more of a hinge, a sleeve, a buckle, one or more magnets, adhesive, and/or other coupling mechanisms.

Retracted configuration 12 may be formed when outward ends 50 of members 20 are positioned at and/or near outward ends 46 of guides 16. Outward ends 50 of members 20 may be configured to translate via guides 16 from inward ends 42 toward outward ends 46 of guides 16, causing apparatus 10 to collapse to a retracted configuration. In retracted configuration 12, members 20 may be positioned in a retracted position near and/or against surface 34 of base 18, according to some implementations.

Protruded configuration 14 may be effectuated from retracted configuration 12 by translating outward ends 50 of members 20 from outward ends 46 of guides 16 to inward ends 42 of guides 16. Translating members 20 from outward ends 46 to inward ends 42 may cause apparatus 10 to protrude from retracted configuration 12 to the protruded configuration 14. When there is an even number of members 20, pairs of opposing members (e.g., first member 54 and second member 56) may form arches 60 in protruded configuration 14. Arches 60 may be formed in a plane substantially perpendicular to first surface 34. Arches 60 may be open toward surface 34. When there are an odd number of members 20, individual ones of members 20 may form half arches such that inward ends 52 of the half arches are coupled to coupler 22 and outward ends 50 are coupled to guides 16. The half arches may be open toward surface 34 and/or away from surface 34.

Figure 3:
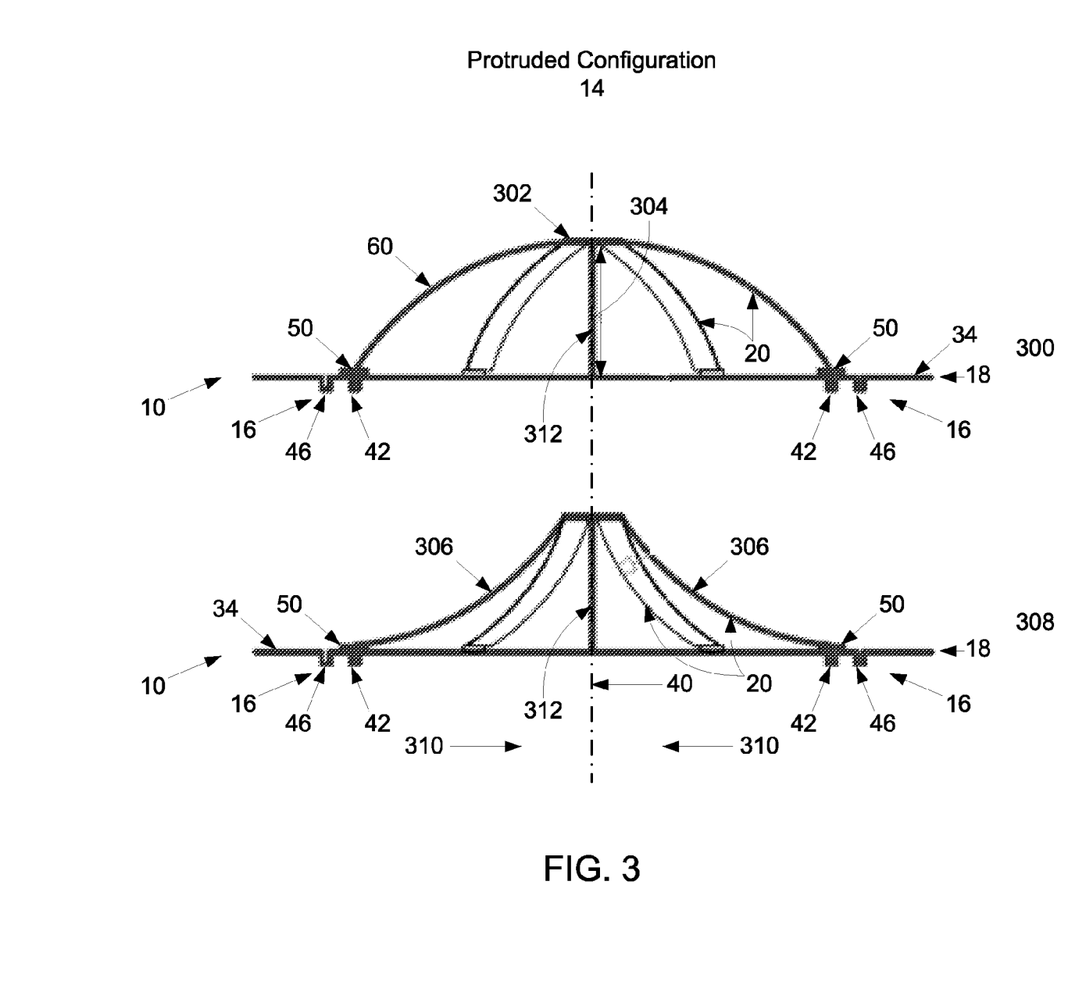
FIG. 3 illustrates a first set of arches having a substantially convex curvature and a second set of arches having a substantially concave curvature, relative to the base, in accordance with one or more implementations.

As shown in FIG. 3, arches 60 may have a substantially convex curvature 300 relative to base 18 such that the peak 302 of arches 60 may be positioned at and or near a maximum protrusion distance 304 from base 18. In some implementations, members 20 may individually form arches 306 in protruded configuration 14 that have substantially concave curvature 308 relative to arches 60. Arches 306 may be formed in a plane substantially perpendicular to first surface 34. Arches 306 may be open away from first surface 34.

Members 20 may be configured to protrude from retracted configuration 12 (shown in FIGS. 1 and 2) by deflecting from their retracted positions near and/or against first surface 34 responsive to a compressive load in a direction 310. The compressive load in direction 310 may act to push outward ends 50 of members 20 toward axis of rotation 40. The compressive load in direction 310 may be generated by rotating apparatus 10 about axis of rotation 40 such that outward ends 50 of members 20 translate from outward ends 46 of guides 16 to inward ends 42 of guides 16. Members 20 may return to their retracted configuration responsive to cessation of the compressive load in direction 310 (e.g., by rotating apparatus 10 in a direction opposite of the direction used to generate the load).

In some implementations, apparatus 10 may be configured such that members 20 may be deflected from protruded configuration 14 responsive to a tensile force. The tensile force may act to stretch outward ends 50 of members 20 away from axis of rotation 40. The tensile load may be generated by rotating apparatus 10 about axis of rotation 40 such that outward ends 50 of members 20 translate from inward ends 42 of guides 16 to outward ends 46 of guides 16. Members 20 may return to their retracted configuration responsive to cessation of the tensile load (e.g., by rotating apparatus 10 in a direction opposite of the direction used to generate the load).

Post 312 may be configured to control member 20 curvature (e.g., for the straight beams member type shown in FIG. 2), maximum protrusion distance 304, and/or other aspects of apparatus 10. Post 312 may be disposed proximate to axis of rotation 40. Post 312 may be configured such that coupler 22 may translate along post 312 responsive to apparatus 10 changing between retracted configuration 12 and protruded configuration 14. For example, coupler 22 may have a hole and/or channel configured to encircle post 312. In some implementations, maximum protrusion distance 304 may be controlled by the length, shape, materials, and/or other characteristics of members 20. In some implementations, maximum protrusion distance 304 may be controlled by the shape, length, and/or other characteristics of guides 16 (shown in FIG. 1 and FIG. 2). Maximum protrusion distance 304 may be adjusted manually and/or automatically.

Figure 4:
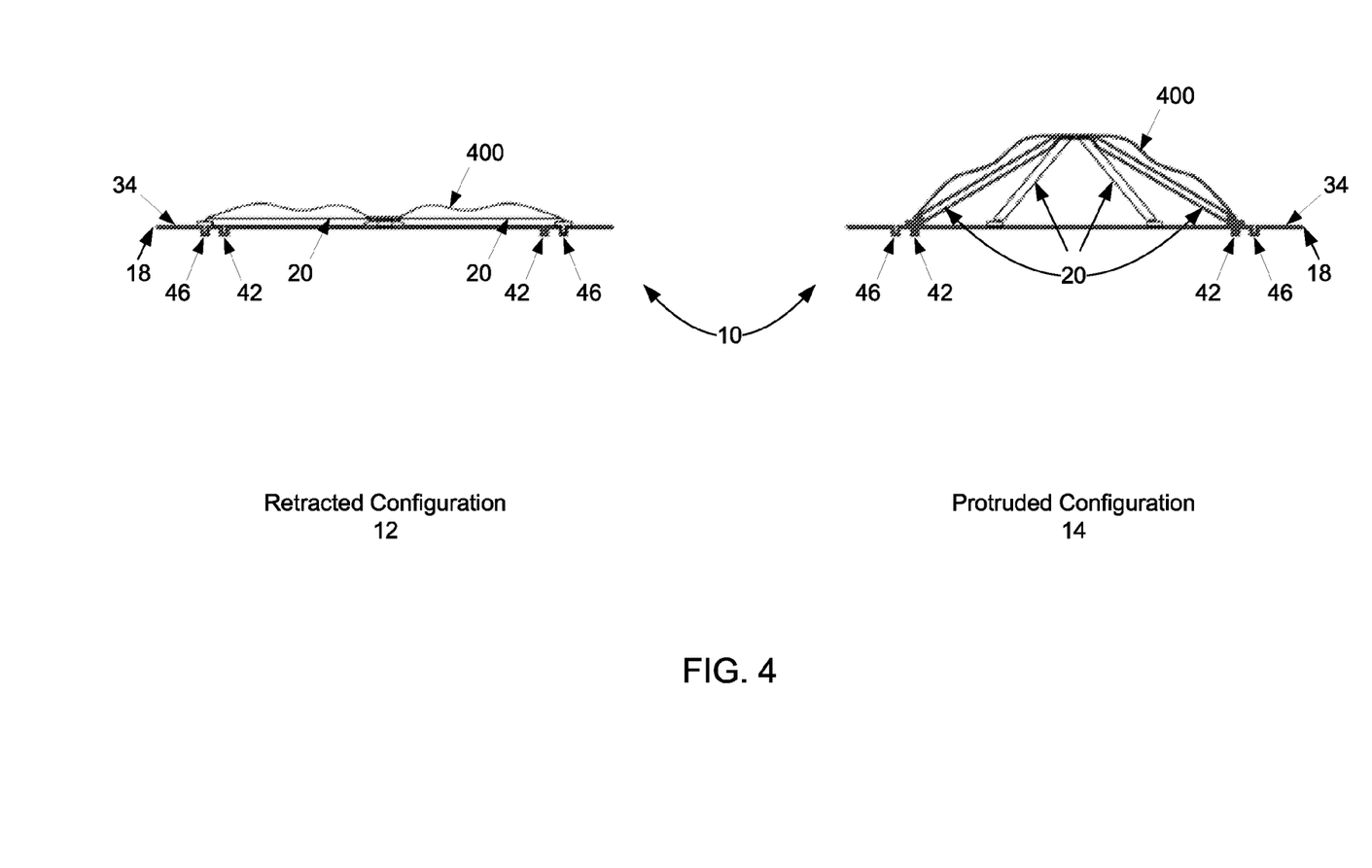
FIG. 4 illustrates a super-structure coupled to the apparatus, in accordance with one or more implementations.

FIG. 4 illustrates a super-structure 400 coupled to apparatus 10, in accordance with one or more implementations. Super-structure 400 may comprise a material coupled to members 20. The material may be configured to form a substantially domed shaped super-structure over apparatus 10 responsive to apparatus 10 occupying protruded configuration 14. Super-structure 400 may be configured to form shapes other than a dome. For example, in FIG. 4, super-structure 400 forms a stepped structure. The material coupled to members 20 may include one or more of a flexible membrane, a fabric, a flexible metal, plastic, a coiled wire, glass, and/or other materials. The material may be optically transparent, translucent, opaque, and/or a combination thereof. In retracted configuration 12, super-structure 400 may be positioned near surface 34 of base 18, configured to be folded, wrapped, and/or stored within apparatus 10, configured to rest loosely against members 20 and/or surface 34, and/or occupy another position. By way of a non-limiting example, super-structure 400 may be a flexible membrane. The flexible membrane may have a circular footprint and may be coupled to members 20 at one or more locations. The flexible membrane may be configured to lay flat against members 20 when apparatus 10 is in retracted configuration 12. The flexible membrane may be configured to stretch to form a dome over members 20 when apparatus 10 is in protruded configuration 14. By way of a second non-limiting example, super-structure 400 may be a coiled wire. The coiled wire may be coupled to members 20 at one or more locations on each member 20. The coiled wire may be configured to form a flat coil and lay on members 20 when apparatus 10 in retracted configuration 12. The coiled wire may be configured to form an expanded spiral pattern over members 20 when apparatus 10 is in protruded configuration 14.

Figure 5:
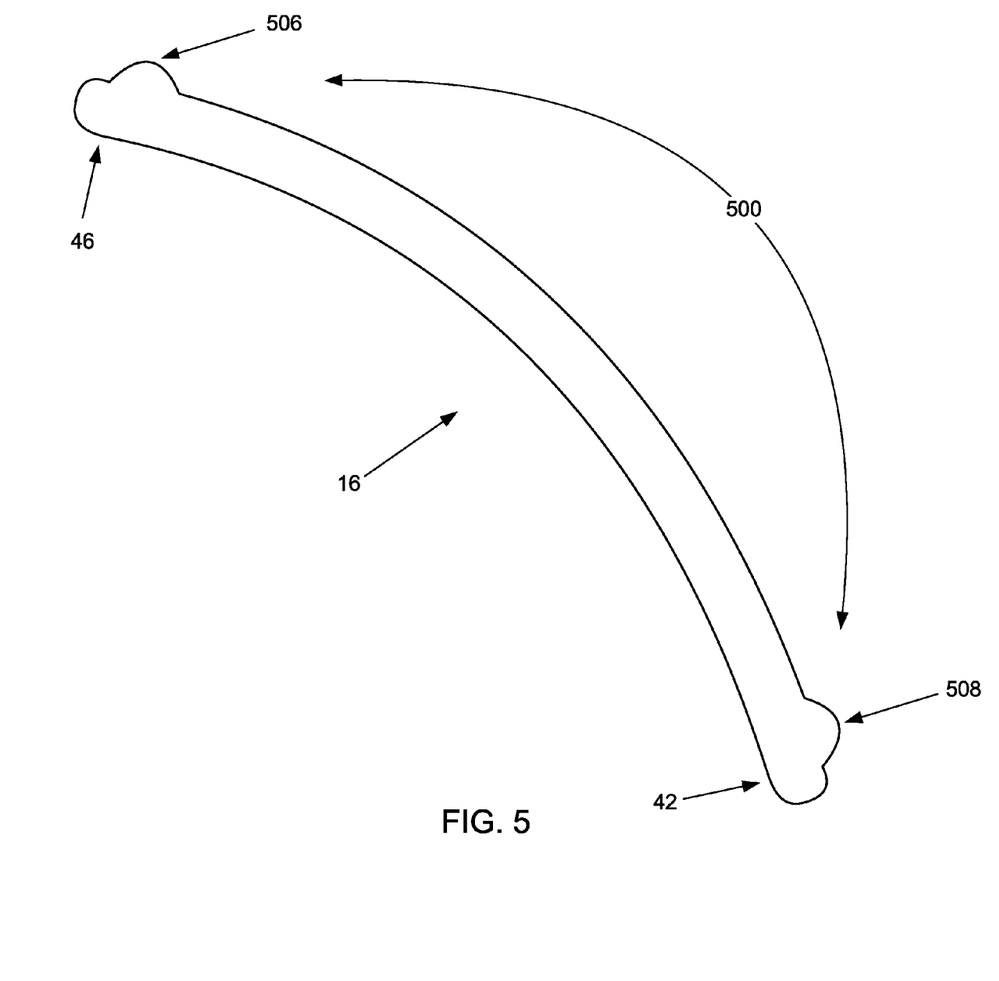
FIG. 5 illustrates a locking mechanism configured to releasably lock the apparatus in a retracted configuration and/or a protruded configuration, in accordance with one or more implementations.

FIG. 5 illustrates a locking mechanism 500 configured to releasably lock apparatus 10 in retracted configuration 12 and/or protruded configuration 14 (shown in FIGS. 1, 2, 4), in accordance with one or more implementations. Locking mechanism 500 may comprise a retracted-configuration locking mechanism and a protruded-configuration locking mechanism. The retracted-configuration locking mechanism may be configured to releasably lock the apparatus in the retracted configuration. The protruded-configuration locking mechanism may be configured to releasably lock the apparatus in the protruded configuration. By way of a non-limiting example, the retracted-configuration locking mechanism may comprise a notch 506 proximate to outward end 46 of guide 16. The protruded-configuration locking mechanism may comprise a notch 508 proximate to the inward end 42 of guide 16. Members 20 (not shown in FIG. 5) may lock in place at notches 506 and/or 508 by extending into notches 506 and/or 508 after translating via guide 16. Members 20 may be released from their locked position by an inward force (e.g., from a user) deflecting the end of member 20 toward axis of rotation 40 (not shown in FIG. 5). It should be appreciated that one or more other locations and/or notch shapes may be appropriate for notches 506 and 508. One or more other locking mechanisms may also be used in addition to and/or instead of notches 506 and/or 508. The present disclosure contemplates other methods of releasably locking apparatus 10 in the retracted and/or protruded configurations.

Figure 6:
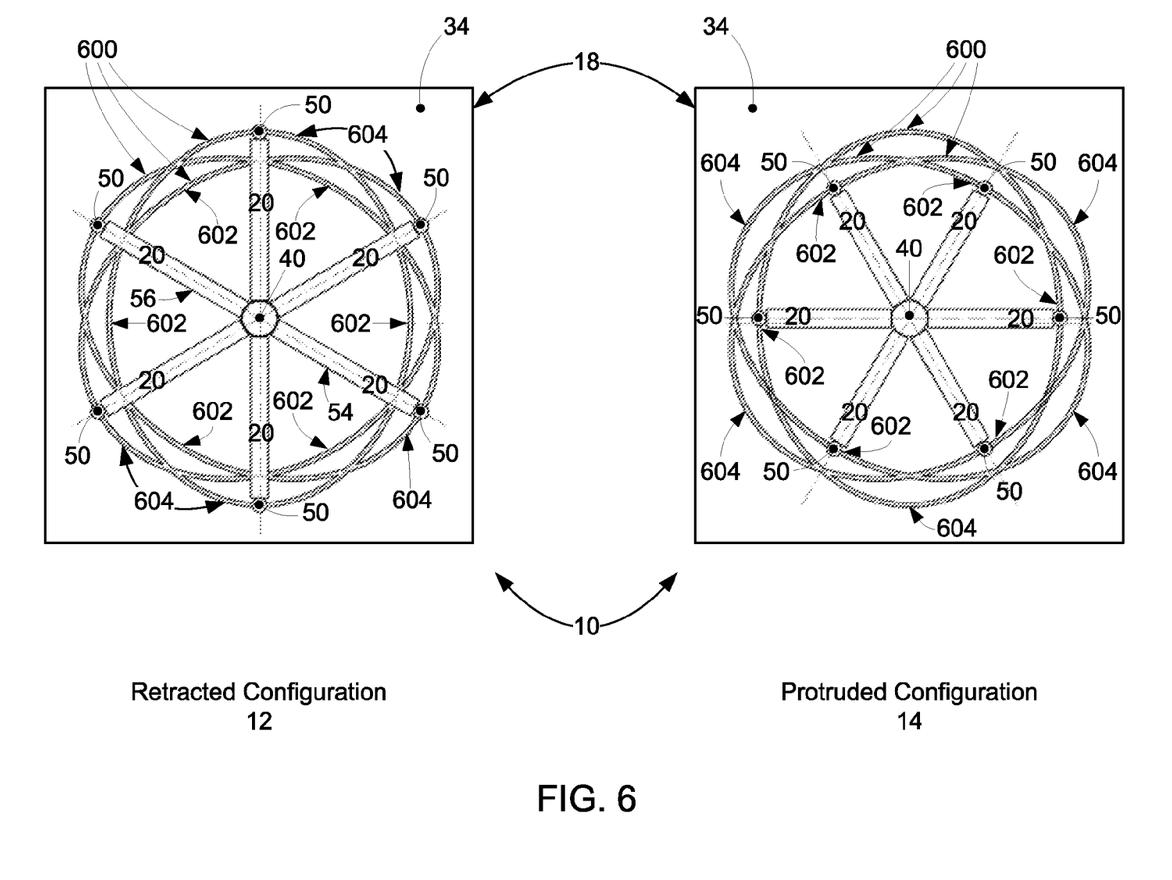
FIG. 6 illustrates exemplary continuous guides, in accordance with one or more implementations.

In some implementations, guides 16 may form one or more continuous guides. For example, FIG. 6 shows continuous guides 600, in accordance with one or more implementations. Continuous guides 600 may be disposed on first surface 34 of base 18. Continuous guides 600 may be oriented about axis of rotation 40. One or more inner portions 602 of continuous guides 600 may be positioned closer to axis of rotation 40 relative to one or more outer portions 604 of continuous guides 600. With continuous guides 600, protruded configuration 14 may be effectuated from retracted configuration 12 by translating outward ends 50 of members 20 from outer portions 604 to inner portions 602 (in either direction), causing apparatus 10 to protrude from retracted configuration 12 to protruded configuration 14.

Continuous guides 600 shown in FIG. 6 have substantially elliptical shapes. The quantity and shape of continuous guides shown in FIG. 6 is not intended to be limiting. The quantity and shape of continuous guides 600 may be any guide quantity and/or shape that allows apparatus 10 to function as described herein. For example, in some implementations, continuous guides 600 may comprise a single continuous guide wherein an outward end 50 of first member 54 and outward end 50 second member 56 engage substantially opposite sides of the continuous guide.

Figure 7:
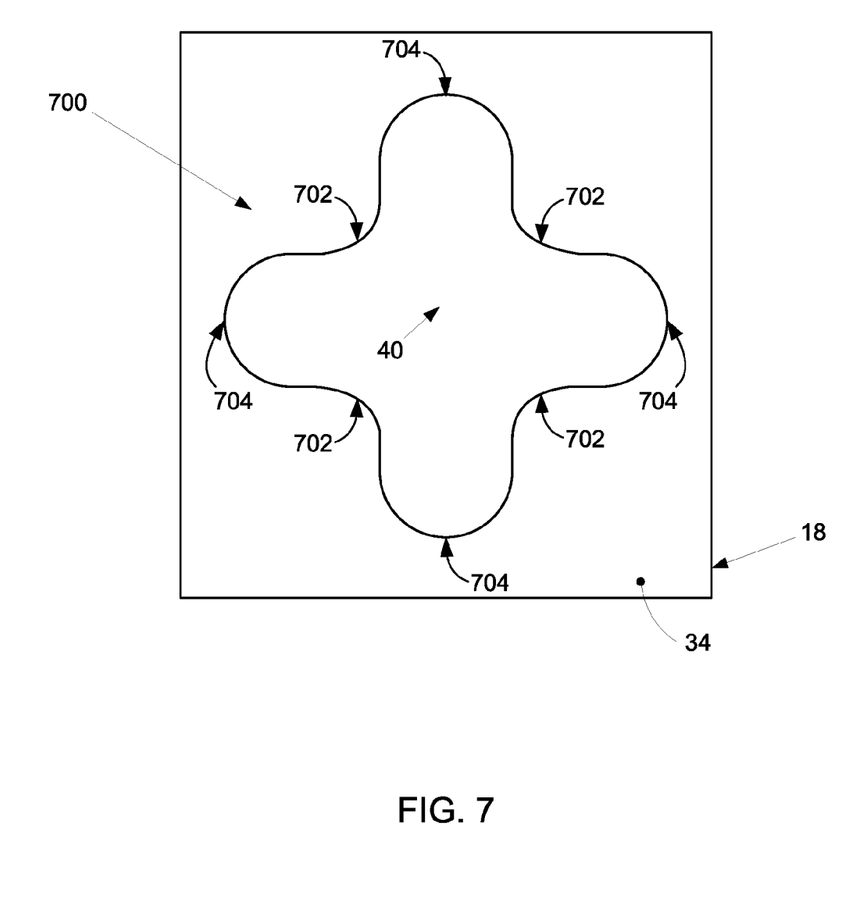
FIG. 7 illustrates an exemplary single continuous guide shape, in accordance with one or more implementations.

FIG. 7 illustrates an exemplary single continuous guide shape 700, in accordance with one or more implementations. Continuous guide 700 may be disposed on surface 34 of base 18. Continuous guide 700 may be oriented about axis of rotation 40. One or more inner portions 702 of continuous guide 700 may be positioned closer to axis of rotation 40 relative to one or more outer portions 704 of continuous guide 700. The protruded configuration (not shown in FIG. 7) may be effectuated from the retracted configuration (not shown in FIG. 7) by translating the outward ends of the members from outer portions 704 to inner portions 702 (in either direction), causing the apparatus to protrude from the retracted configuration to the protruded configuration. The present disclosure contemplates other single continuous guide shape possibilities.

Figure 8:
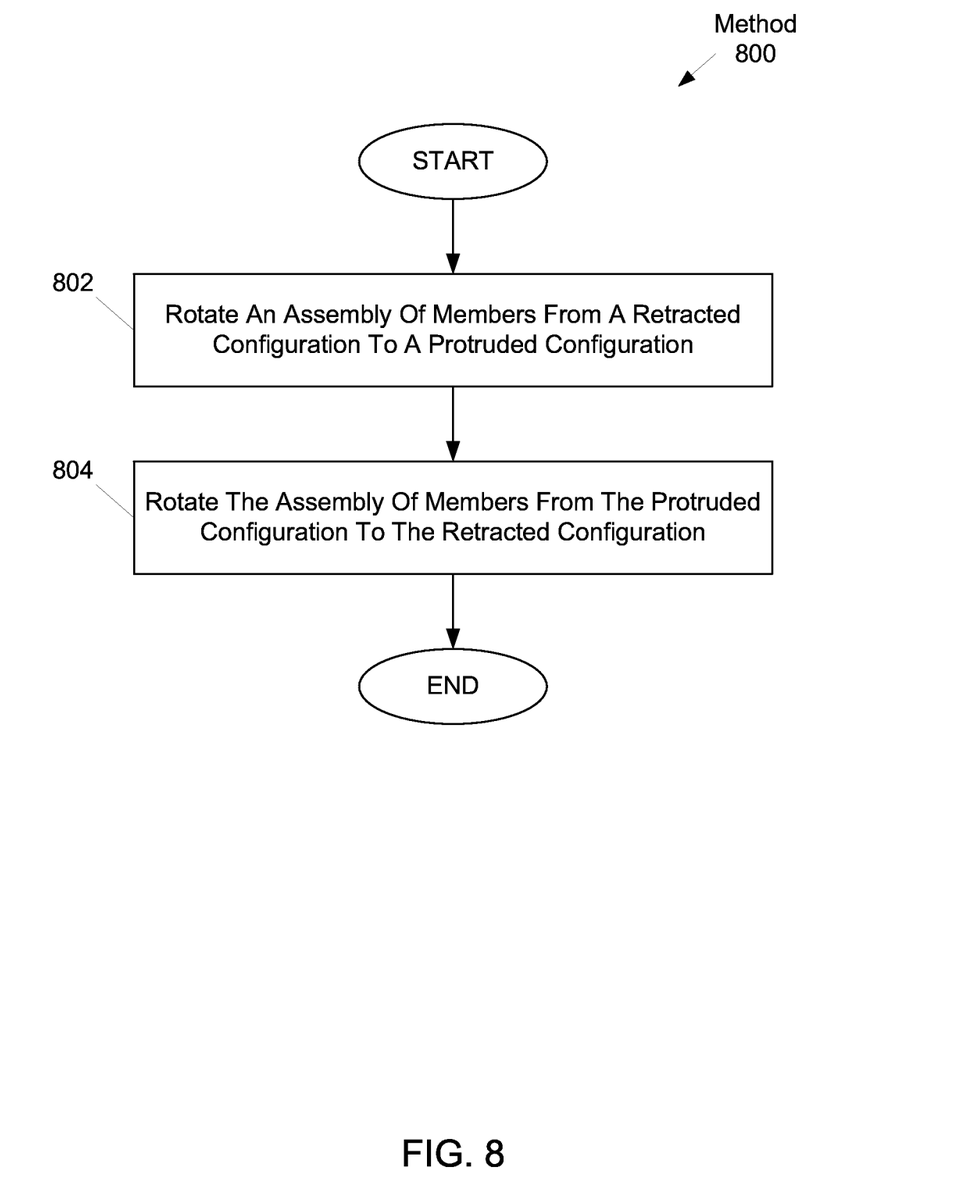
FIG. 8 illustrates a method of effectuating a protruded configuration from a retracted configuration with a retractable protrusive structure, in accordance with one or more implementations.

FIG. 8 illustrates a method 800 of effectuating a protruded configuration from a retracted configuration with a retractable protrusive structure, in accordance with one or more implementations. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

At an operation 802, an assembly of members may be rotated about an axis of rotation. Outward ends of individual ones of the assembly of members may translate via one or more guides disposed on a surface of a base. Translating the outward ends may cause the retractable protrusive structure to transform from the retracted configuration to the protruded configuration. The outward ends of the individual ones of the assembly of members may be positioned closer to the axis of rotation in the protruded configuration relative to the position of the outward ends of the individual ones of the assembly of members in the retracted configuration. In some embodiments, operation 802 may be performed by members, a base, and/or guides the same as or similar to members 20, base 18, and/or guides 16 (shown in FIG. 1 and described herein).

At an operation 804, an assembly of members may be rotated about the axis of rotation in substantially the opposite direction compared to the rotation in operation 802. The outward ends of the individual ones of the assembly of members may translate via the one or more guides disposed on the surface of the base. Translating the outward ends may cause the retractable protrusive structure to transform from the protruded configuration to the retracted configuration. The outward ends of the individual ones of the assembly of members may be positioned farther from the axis of rotation in the retracted configuration relative to the position of the outward ends of the individual ones of the assembly of members in the protruded configuration. In some embodiments, operation 804 may be performed by members, a base, and/or guides the same as or similar to members 20, base 18, and/or guides 16 (shown in FIG. 1 and described herein).

An exercise device may include one or more of a housing body, a force sensor, display apparatus, communications apparatus, an actuator, an audio transducer, a user interface, a geo-location sensor, a power supple, electronic storage, one or more processors, and/or other components.

The housing body may be configured to carry one or more other components of the exercise device. These one or more other components may be disposed partially or wholly within the housing body, or be affixed to an external surface of the housing body.

The housing body may include flexible plastic, and/or other material. The flexible components may be disposed on opposite sides of the housing body. The flexible components may be formed of rubber, flexible plastic, and/or other material. The flexible components may be configured to support the force sensor. Compressive forces may be applied in opposite directions to the flexible component, which convey the force to the force sensor. Such compressive forces may be exerted during personal exercise.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An apparatus configured to provide a retractable protrusive structure, the apparatus comprising:
    a base comprising a first surface;
    a plurality of guides disposed on the first surface, the plurality of guides radially spaced about an axis of rotation, the axis of rotation being substantially perpendicular to the first surface, the plurality of guides including a first guide and a second guide, a first end of the first guide and a first end of the second guide being positioned closer to the axis of rotation relative to a second end of the first guide and a second end of the second guide;
    a plurality of members including a first member and a second member, individual ones of the plurality of members corresponding to individual ones of the plurality of guides, an outward end of the first member being configured to translate via the first guide from the first end of the first guide to the second end of the first guide, and an inward end of the first member being configured to couple with an inward end of the second member;
    wherein:
        a protruded configuration is effectuated from a retracted configuration by translating the outward end of the first member from the second end of the first guide to the first end of the first guide, and translating an outward end of the second member from the second end of the second guide to the first end of the second guide, causing the apparatus to protrude from the retracted configuration to the protruded configuration; and
        the retracted configuration comprises the first member and the second member lying flat against the first surface.

2. The apparatus of claim 1, wherein individual ones of the plurality of guides have an arcuate shape.

3. The apparatus of claim 1, wherein the inward end of the first member is fixed to the inward end of the second member such that the first member and the second member form a singular member.

4. The apparatus of claim 1, further comprising a coupler positioned proximate to the axis of rotation, wherein the inward end of the first member and the inward end of the second member are coupled by the coupler such that the members extend outwardly from the coupler toward the guides.

5. The apparatus of claim 4, wherein the plurality of members are fixedly coupled to the coupler.

6. The apparatus of claim 4, wherein the plurality of members are removably coupled to the coupler.

7. The apparatus of claim 4, further comprising a post disposed proximate to the axis of rotation, the post being configured such that the coupler translates along the post responsive to the apparatus changing between the retracted configuration and the protruded configuration.

8. The apparatus of claim 1, wherein the first member and the second member form an arch in the protruded configuration in a plane substantially perpendicular to the first surface, the arch being open toward the first surface.

9. The apparatus of claim 1, wherein, the first member forms a first arch and the second member forms a second arch in the protruded configuration, in a plane substantially perpendicular to the first surface, the first arch and the second arch being open away from the first surface.

10. The apparatus of claim 1, wherein the plurality of members have default positions and are formed from a resilient material such that:
    the first member deflects from a default position against the first surface responsive to a load in a first direction, the load in the first direction acting to push the outward end and the inward end of the first member closer together; and
    the first member returns to the default position responsive to cessation of the load in the first direction.

11. The apparatus of claim 1, further comprising a retracted-configuration locking mechanism and a protruded-configuration locking mechanism, the retracted-configuration locking mechanism configured to releasably lock the apparatus in the retracted configuration, the protruded-configuration locking mechanism configured to releasably lock the apparatus in the in protruded configuration.

12. The apparatus of claim 11, wherein the retracted-configuration locking mechanism comprises a notch proximate to the second end of the first guide, and wherein the protruded configuration locking mechanism comprises a notch proximate to the first end of the first guide.

13. The apparatus of claim 1, wherein individual ones of the plurality of members comprise one or more of straight beams, curved beams, or trusses.

14. The apparatus of claim 1, wherein individual ones of the plurality of members are flexible.

15. The apparatus of claim 14, wherein individual ones of the plurality of members have a specific elasticity profile, and wherein the elasticity profiles of the plurality of members are adjustable such that the apparatus may be configured for damping.

16. The apparatus of claim 1, wherein individual ones of the plurality of members are rigid.

17. The apparatus of claim 1, further comprising a material coupled to the plurality of members, the material configured to form a substantially domed super-structure over the protruded configuration.

18. The apparatus of claim 1, wherein the protruded configuration includes a maximum protrusion distance, and wherein the maximum protrusion distance is adjustable.

19. The apparatus of claim 1, further comprising a flexible material disposed over the plurality of members such that the first member and second member are positioned between the material and the first surface of the base, wherein the material is configured to form a substantially dome-shaped structure when the apparatus is in a protruded configuration.

20. The apparatus of claim 19, wherein the material comprises a resilient sheet.

21. The apparatus of claim 19, wherein the base is affixed to or integrated with a housing body of a handheld personal exercise device.

22. The apparatus of claim 21, wherein the dome-shaped structure is configured to receive a compressive force exerted by a user during personal exercise.

* * * * *